United States Patent
Harvey

[15] 3,701,351
[45] Oct. 31, 1972

[54] INFLATABLE INTRAVAGINAL APPLICATOR FOR ANIMALS

[72] Inventor: Douglas G. Harvey, R. R. No. 1 Freeport Road, Sterling, Ill. 61081

[22] Filed: June 28, 1971

[21] Appl. No.: 157,273

[52] U.S. Cl. ................... 128/260, 128/246, 128/344
[51] Int. Cl. .............................................. A61m 7/00
[58] Field of Search......128/129, 246, 251, 260, 285, 128/344

[56] References Cited

UNITED STATES PATENTS

| | | | |
|---|---|---|---|
| 485,107 | 10/1892 | Maddux | 128/246 |
| 1,245,325 | 11/1917 | Dunn | 128/246 |
| 1,306,184 | 6/1919 | Jones | 128/246 X |
| 2,650,592 | 9/1953 | Borda | 128/344 |
| 2,888,925 | 6/1959 | Philips | 128/251 |
| 3,157,180 | 11/1964 | Bakunin | 128/285 |

FOREIGN PATENTS OR APPLICATIONS

| | | | |
|---|---|---|---|
| 742,746 | 3/1933 | France | 128/246 |

*Primary Examiner*—Charles F. Rosenbaum
*Attorney*—Carlton Hill et al.

[57] ABSTRACT

An intra-vaginal device for hogs and other animals comprising a flexible capsule having apertures therein, a fluid-tight distendible collar on the capsule arranged to be enlarged by introduction of fluid therein, and a fluid inlet conduit communicating with the collar to introduce fluid therein, the conduit being self-retractable during use.

6 Claims, 2 Drawing Figures

PATENTED OCT 31 1972 3,701,351
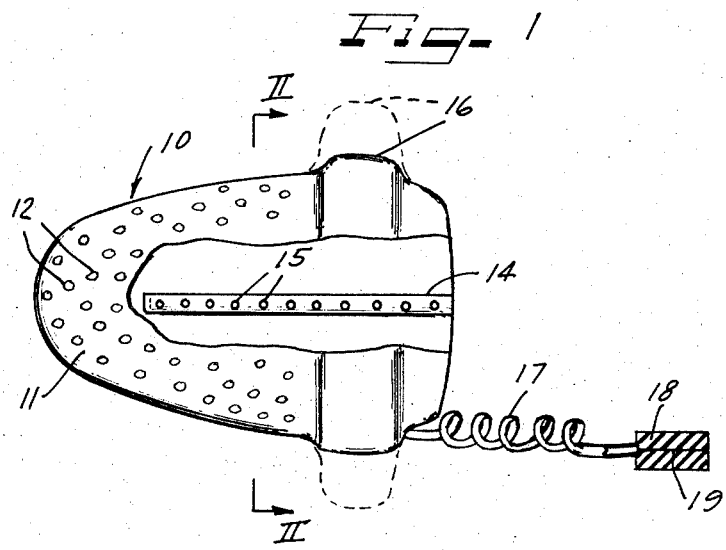
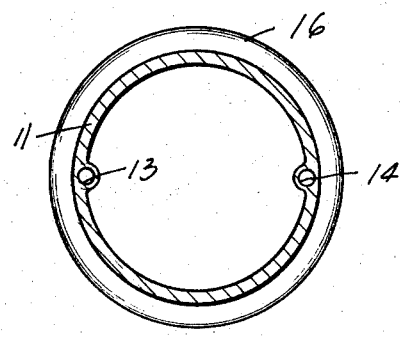
INVENTOR.
DOUGLAS G. HARVEY
BY
ATTORNEYS 3,701,351

INFLATABLE INTRAVAGINAL APPLICATOR FOR ANIMALS

BACKGROUND OF THE INVENTION

1. Field of the Invention

This invention is in the field of animal husbandry devices which are intended to be firmly received within the vagina of a mammal for the purpose of introducing medication or monitoring purposes, consisting of a flexible capsule which can be enlarged by introduction of a suitable fluid therein so that it is snugly received against the wall of the vagina past the pelvic area, and can be deflated to be easily removable.

2. Description of the Prior Art

In my copending application, Ser. No. 739,756 filed June 25, 1968, now U.S. Pat. No. 3,583,389, I have described a method and apparatus for monitoring temperature changes in mammals for the purpose of indicating impending birth. Briefly, the device described in that application consists of a miniature radio transmitter with a temperature sensitive element connected thereto so that upon expulsion, the transmitter is rendered operative and a visual or audible means associated with a remotely positioned receiver provides a signal at the remote location.

The present invention provides a receptacle which can be effectively employed with the miniaturized transmitter described in my aforementioned application. The same receptacle can also be used for introducing medication such as hormones into the animal. Such hormone injection is desirable, for example, in inducing ovulation, such controlled ovulation being beneficial from the standpoint of increasing the size of the litter in breeding.

There is a significant difficulty in attempting to lodge a container, whether for an instrument or for medication in the vagina of an animal, particularly in the case of a hog. The presence of the foreign object in the vagina area tends to promote the formation of a discharge which could be a source of infection if it were permitted to remain. In addition, any such receptacle should not have any portion thereof protruding from the animal, since experience has shown that this leads to extraction of the device by other animals.

SUMMARY OF THE INVENTION

The present invention provides a receptacle of capsule form composed of a flexible body having apertures therein which permit medication to be diffused into the uterus of the animal. It also includes a fluidtight distendible collar on the capsule which, in the collapsed position, enables the capsule to be located behind the pelvic area but, which can be inflated by the introduction of a gas or liquid to locate the receptacle in position beyond the pelvic area. A fluid inlet is provided which communicates with the collar for the purpose of introducing the fluid therein. The conduit is self-retractable as, for example, by making it in the form of a helical winding so that it is self-contracting upon the release of tension, much the same as a telephone cable running from the mouthpiece to the cradle of the telephone. At the end of the conduit, there is provided a check valve means which can be opened by the introduction of a hypodermic syringe therein to inject water or air into the distendible collar. Withdrawal of the syringe automatically closes the device against leakage.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a side elevational view, partially broken away, of a device employing the improvements of the present invention; and FIG. 2 is a cross-sectional view taken substantially along the line II—II of FIG. 1.

DESCRIPTION OF THE PREFERRED EMBODIMENTS

In FIG. 1, reference numeral 10 indicates generally an intra-vaginal device of the present invention, including a flexible oval-shaped body portion 11 composed of rubber or suitable synthetic resin material. The body portion 11 is sufficiently thin so as to be quite flexible. Distributed along the body portion 11 are a series of apertures 12 for the purpose of permitting medication to be introduced into the hollow interior of the device to be assimilated gradually by the body fluids. Where the device is to be used as a receptacle for electronic instruments, or the like, the apertures 12 may be dispensed with.

Extending longitudinally at diametrically opposed portions of the body 11 are a pair of integral ribs 13 and 14, the ribs each having a series of spaced apertures 15 therealong as best illustrated in FIG. 1. The hollow ribs 13 and 14 serve as drainage tubes to permit drainage of secretions forwardly of the vaginal wall when the device is in position.

An integral collar 16 is formed on the forward end of the body portion 11 and provides a fluid-tight chamber. Water or other fluid is injected into the fluid-tight chamber provided by the collar 16 by means of a helically coiled conduit 17. The fluid can be injected into the collar 16 through a check valve generally indicated at 18 in the drawings, the particular form of the check valve there illustrated consisting of a solid elastic body portion having a longitudinal slit 19 extending therethrough. The natural resilience of the body portion normally keeps the slit closed so that leakage is prevented from the collar 16. However, upon injection of a hypodermic syringe into the slit 19, the fluid can be injected into the collar 16 to cause it to become inflated as illustrated in the dash lines of FIG. 1.

With the collar 16 deflated, the device is positioned behind the cervix in the animal and then a suitable fluid is injected into the conduit 17 to distend the collar 16 as illustrated in the dash lines. The inflation of the collar to two or three times its normal radial thickness provides an effective barrier which prevents dislodgment of the device from behind the wall of the cervix. The inherent resiliency of the helically coiled conduit 17 then retracts the conduit 17 as well as the check valve member 18 into a position in which there is not protruding portion visible at the surface.

The type of device illustrated in the drawings is particularly useful in conjunction with hogs and it should be evident that it can also be used with other types of mammals and for any application where it is necessary to firmly position such a capsule within the vagina.

I claim as my invention:

1. An intra-vaginal device comprising a flexible capsule having apertures therein, a fluid-tight distendible collar on said capsule arranged to be enlarged by introduction of fluid therein, and a fluid inlet conduit communicating with said collar to introduce fluid therein, said conduit being self-retractable during use.

2. The device of claim 1 in which said capsule is generally oval-shaped.

3. The device of claim 2 which includes means in said capsule defining a longitudinal passage for fluid drainage from the interior of said capsule beyond said collar.

4. The device of claim 1 in which said conduit is helically wound so that it is self-contracting upon the release of tension.

5. The device of claim 1 in which said conduit contains a check valve arranged to be opened by injection of a hypodermic needle there in.

6. The device of claim 1 in which said collar is of sufficient diameter when inflated to hold the device against the vaginal wall forward of the pelvic area and prevent displacement.

* * * * *